US012564295B1

(12) United States Patent
Washington

(10) Patent No.: US 12,564,295 B1
(45) Date of Patent: Mar. 3, 2026

(54) FOOT SCRUBBING DEVICE

(71) Applicant: Michelle Washington, Laurel, MD (US)

(72) Inventor: Michelle Washington, Laurel, MD (US)

( * ) Notice: Subject to any disclaimer, the term of this patent is extended or adjusted under 35 U.S.C. 154(b) by 318 days.

(21) Appl. No.: 18/372,748

(22) Filed: Sep. 26, 2023

(51) Int. Cl.
*A47K 7/02* (2006.01)
*A47K 7/04* (2006.01)
*A61H 23/02* (2006.01)
*A61H 35/00* (2006.01)

(52) U.S. Cl.
CPC ................ *A47K 7/026* (2013.01); *A47K 7/04* (2013.01); *A61H 23/02* (2013.01); *A61H 35/006* (2013.01); *A61H 2205/12* (2013.01)

(58) Field of Classification Search
CPC .......... A47K 3/022; A47K 7/026; A47K 7/04; A61H 23/02; A61H 35/006; A61H 2205/12
USPC .................................. 4/541.1, 606, 621, 622
See application file for complete search history.

(56) References Cited

U.S. PATENT DOCUMENTS 6,405,390 B2 6/2002 Kuen
6,725,471 B2 4/2004 Ferber
D518,182 S 3/2006 Cafaro
8,545,516 B1 10/2013 Winnett
9,609,984 B1 4/2017 Kelly
10,639,073 B1 5/2020 Serna
2004/0254511 A1 12/2004 Brborich
2005/0081292 A1 * 4/2005 Lev ..................... A61H 35/006 4/622

FOREIGN PATENT DOCUMENTS

CN 109091378 A * 12/2018 ............. A61H 23/02
KR 200353372 Y1 * 6/2004 ........... A61H 35/006
KR 200383407 Y1 * 5/2005 ........... A61H 35/006
WO 2368790 12/2004

* cited by examiner

*Primary Examiner* — Tuan N Nguyen
(74) *Attorney, Agent, or Firm* — Kyle A. Fletcher, Esq.

(57) ABSTRACT

The foot scrubbing device is a therapeutic device. The foot scrubbing device is adapted for use with a foot. The foot scrubbing device cleans the foot. The foot scrubbing device further massages the foot. The foot scrubbing device incorporates a pan structure, a vibration plate, and a control circuit. The vibration plate and the control circuit mount in the pan structure. The pan structure contains a cleaning solution used to clean the foot. The control circuit is an electric circuit that converts electric energy into a vibration. The control circuit forms a mechanical linkage with the vibration plate. The control circuit transfers the generated vibration to the vibration plate. The foot rests on the vibration plate. The vibration of the vibration plate massages the foot.

11 Claims, 5 Drawing Sheets

FOOT SCRUBBING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of baths specially adapted for particular use. (A47K3/022)

Summary of Invention

The foot scrubbing device is a therapeutic device. The foot scrubbing device is adapted for use with a foot. The foot scrubbing device cleans the foot. The foot scrubbing device further massages the foot. The foot scrubbing device comprises a pan structure, a vibration plate, and a control circuit. The vibration plate and the control circuit mount in the pan structure. The pan structure contains a cleaning solution used to clean the foot. The control circuit is an electric circuit that converts electric energy into a vibration. The control circuit forms a mechanical linkage with the vibration plate. The control circuit transfers the generated vibration to the vibration plate. The foot rests on the vibration plate. The vibration of the vibration plate massages the foot.

These together with additional objects, features and advantages of the foot scrubbing device will be readily apparent to those of ordinary skill in the art upon reading the following detailed description of the presently preferred, but nonetheless illustrative, embodiments when taken in conjunction with the accompanying drawings.

In this respect, before explaining the current embodiments of the foot scrubbing device in detail, it is to be understood that the foot scrubbing device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the foot scrubbing device.

It is therefore important that the claims be regarded as including such equivalent construction insofar as they do not depart from the spirit and scope of the foot scrubbing device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
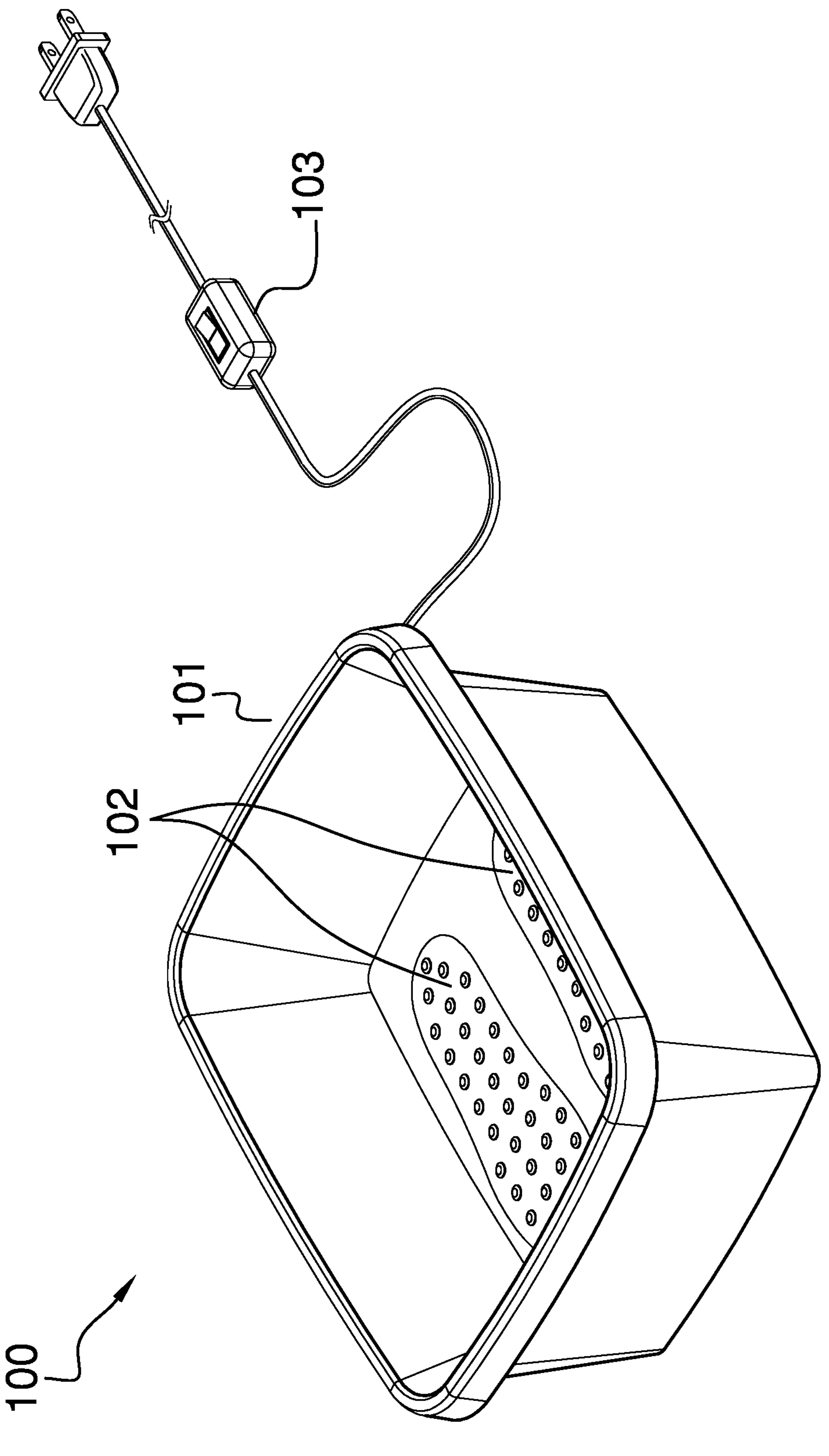
FIG. 1 is a perspective view of an embodiment of the disclosure.
Figure 2:
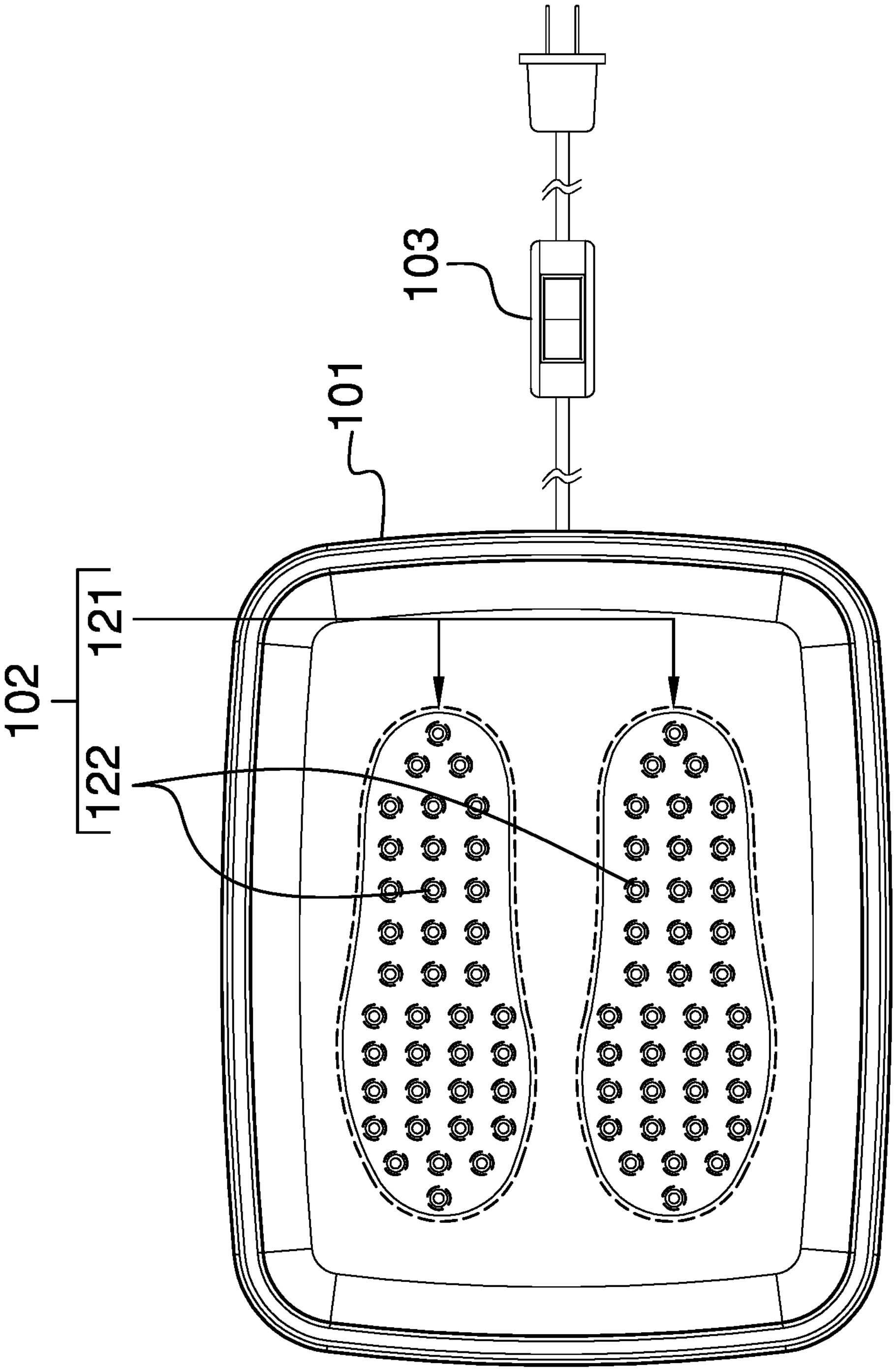
FIG. 2 is a superior view of an embodiment of the disclosure.
Figure 3:
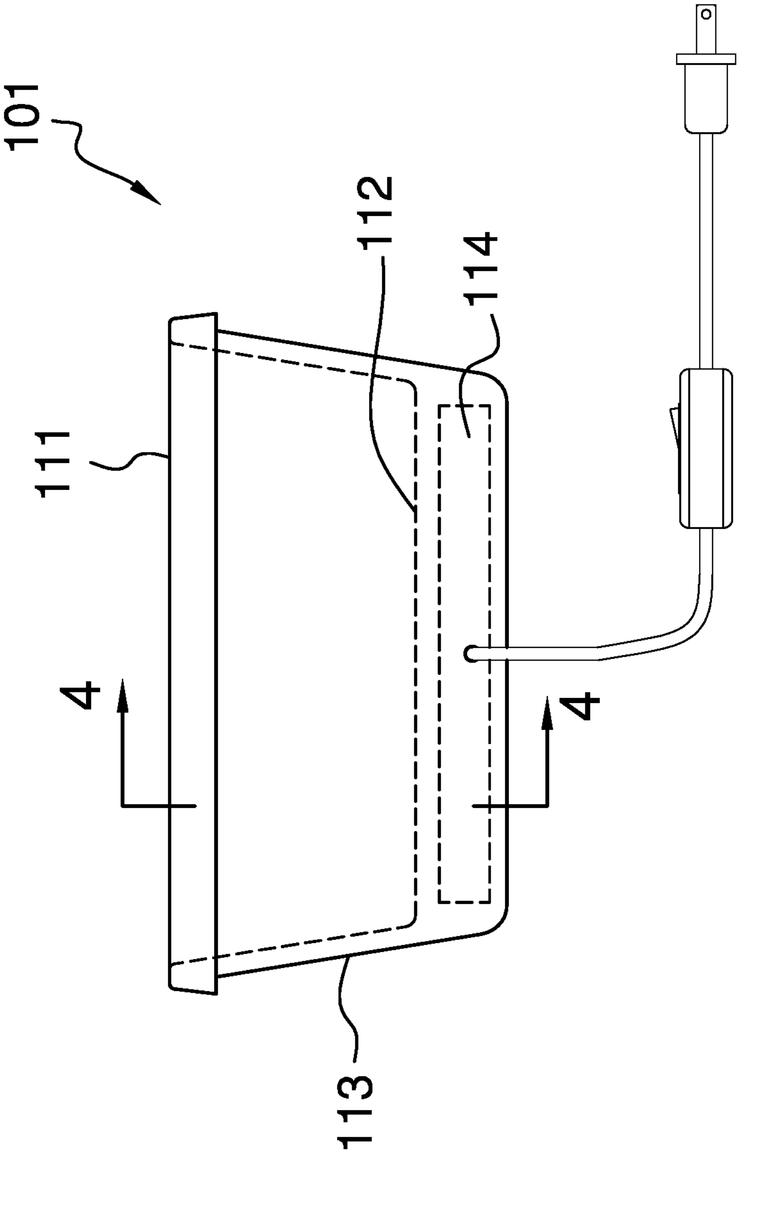
FIG. 3 is a lateral view of an embodiment of the disclosure.
Figure 4:
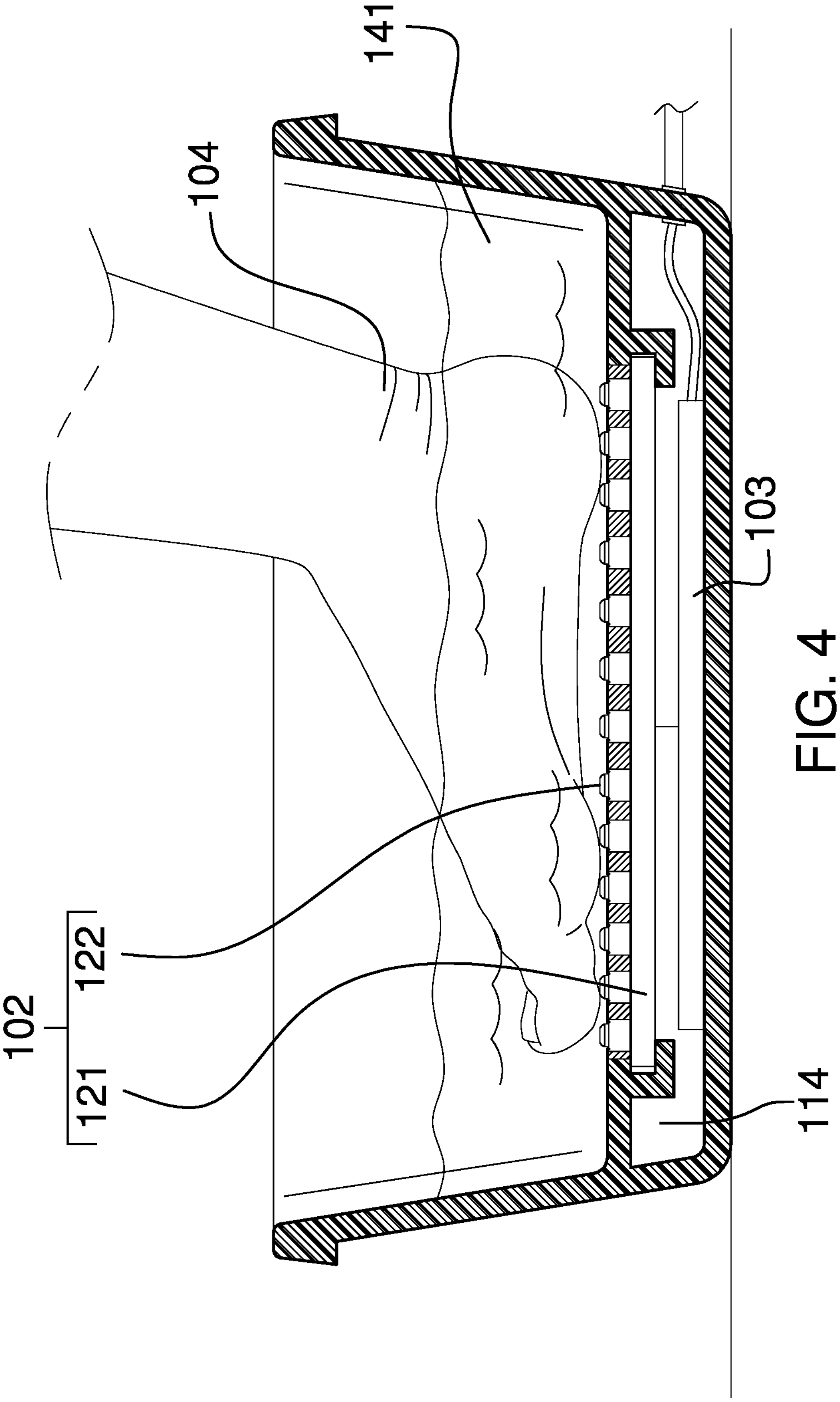
FIG. 4 is a cross-sectional view of an embodiment of the disclosure across 4-4 as shown in FIG. 3.
Figure 5:
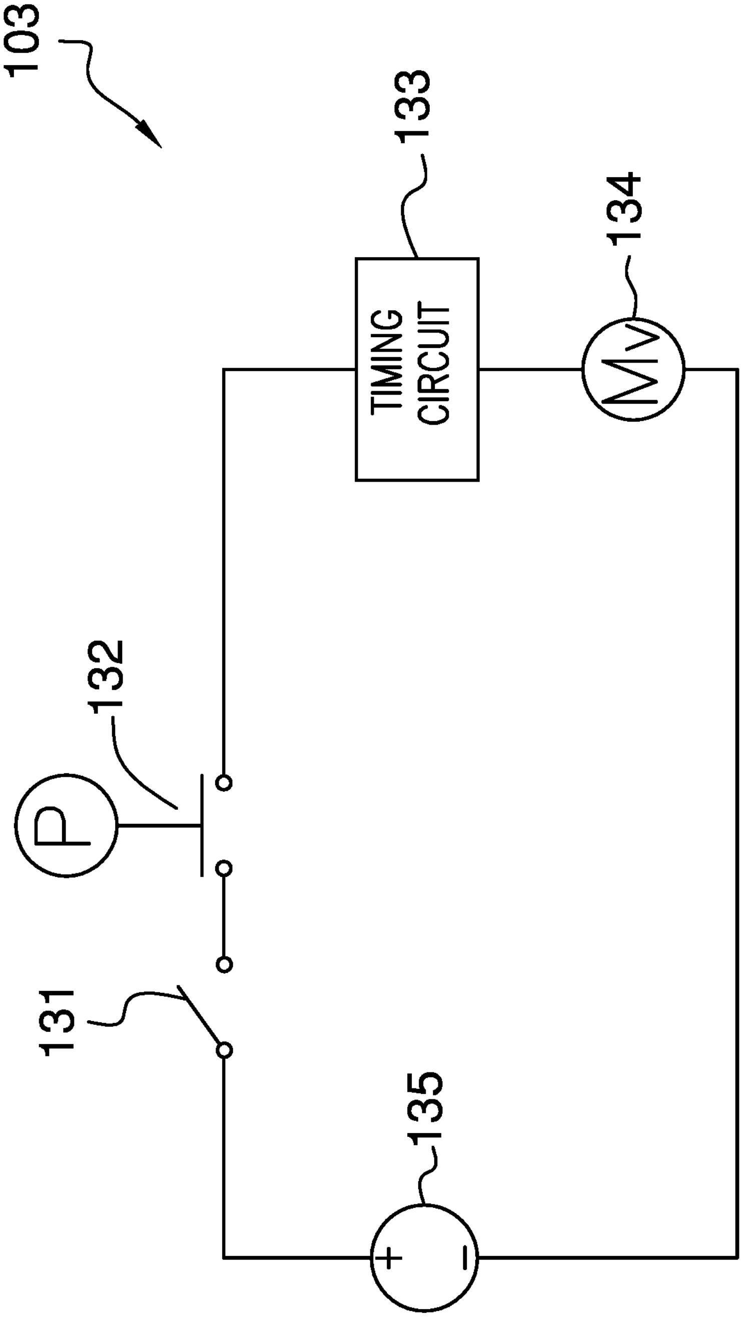
FIG. 5 is a schematic view of an embodiment of the disclosure.

Detailed reference will now be made to one or more potential embodiments of the disclosure, which are illustrated in FIGS. 1 through 5.

The foot scrubbing device 100 (hereinafter invention) is a therapeutic device. The invention 100 is adapted for use with a foot 104. The invention 100 cleans the foot 104. The invention 100 further massages the foot 104. The invention 100 comprises a pan structure 101, a vibration plate 102, and a control circuit 103. The vibration plate 102 and the control circuit 103 mount in the pan structure 101. The pan structure 101 contains a cleaning solution used to clean the foot 104. The control circuit 103 is an electric circuit that converts electric energy into a vibration. The control circuit 103 forms a mechanical linkage with the vibration plate 102. The control circuit 103 transfers the generated vibration to the vibration plate 102. The foot 104 rests on the vibration plate 102. The vibration of the vibration plate 102 massages the foot 104.

The pan structure 101 is a roughly prism shaped structure. The pan structure 101 has a pan shape. The pan structure 101 is a hollow structure. The pan structure 101 is formed from a fluid impermeable material. The pan structure 101 forms a container used to hold a cleaning solution 141. The foot 104 is submerged in the cleaning solution 141. The pan structure 101 comprises an open face 111, a closed face 112, and a lateral face structure 113. The pan structure 101 further comprises a circuit chamber 114.

The open face 111 is the open face 111 of the pan shape of the pan structure 101. The foot 104 inserts into the pan structure 101 through the open face 111.

The closed face 112 is the closed face 112 of the pan shape of the pan structure 101. The closed face 112 is the face of the pan structure 101 that is distal from the open face 111. The closed face 112 forms the horizontally oriented boundary surface of the containment space formed by the pan structure 101. The vibration plate 102 mounts on the interior surface of the closed face 112.

The lateral face structure 113 is the lateral face of the pan shape of the pan structure 101. The lateral face structure 113 forms the vertically oriented boundary surfaces of the containment space formed by the pan structure 101.

The circuit chamber 114 is a fluid impermeable chamber that is formed in the pan structure 101. The circuit chamber 114 forms a negative space located under the closed face 112 of the pan structure 101. The circuit chamber 114 forms a protected space that contains the control circuit 103. The vibration plate 102 forms the mechanical linkage with the control circuit 103 through the superior boundary of the circuit chamber 114.

The vibration plate 102 is a disk shaped structure. The vibration plate 102 is a rigid structure. The vibration plate 102 mounts on the superior surface of the closed face 112 of the pan structure 101. The vibration plate 102 forms a pedestal. The foot 104 rests on the vibration plate 102. The vibration plate 102 comprises a vibrating disk structure 121. The vibrating disk structure 121 further comprises an abrasive surface 122.

The vibrating disk structure 121 is a rigid structure. The vibrating disk structure 121 is a disk shaped structure. The vibrating disk structure 121 mounts on the interior surface of the closed face 112. The vibrating disk structure 121 forms the pedestal structure of the vibration plate 102. The vibrating disk structure 121 transfers the load of the foot 104 to the closed face 112 of the pan structure 101.

The abrasive surface 122 is formed on the superior face of the vibrating disk structure 121. The abrasive surface 122 forms an abrasive surface that the foot 104 rests on. The vibration of the vibrating disk structure 121 generates the friction between the foot 104 and the abrasive surface 122 that cleans and massages the foot 104.

The control circuit 103 is an electric circuit. The control circuit 103 converts electric energy into a vibration. The control circuit 103 transmits the generated vibration to the vibrating disk structure 121 of the vibration plate 102. The control circuit 103 initiates the vibration of the vibrating disk structure 121. The control circuit 103 discontinues the vibration of the vibrating disk structure 121. The control circuit 103 comprises a power switch 131, a pressure switch 132, a timing circuit 133, a vibration motor 134, and an external power source 135. The power switch 131, the pressure switch 132, the timing circuit 133, the vibration motor 134, and the external power source 135 are electrically interconnected.

The power switch 131 is a maintained electric switch. The power switch 131 forms an electric connection between the external power source 135 and the pressure switch 132. The power switch 131 actuates to the closed position to enable the flow of electric energy from the external power source 135 to the pressure switch 132. The power switch 131 actuates to the open position to disable the flow of electric energy from the external power source 135 to the pressure switch 132.

The pressure switch 132 is a momentary electric switch. The pressure switch 132 is positioned underneath the vibrating disk structure 121 of the vibration plate 102. The pressure switch 132 is operated by the foot 104. The pressure of the foot 104 resting on the vibrating disk structure 121 actuates the pressure switch 132 to the closed position. The pressure switch 132 is actuated to an open position when the foot 104 is not resting on the vibrating disk structure 121. In the closed position, the pressure switch 132 enables the flow of electric energy from the power switch 131 into the timing circuit 133 and the vibration motor 134. In the open position, the pressure switch 132 disables the flow of electric energy from the power switch 131 into the timing circuit 133 and the vibration motor 134.

The timing circuit 133 is an electric circuit. The timing circuit 133 forms a timing device. The timing circuit 133 initiates operation when the pressure switch 132 actuates into the closed position. The timing circuit 133 controls the flow of electric energy into the vibration motor 134. The timing circuit 133 delays the flow of electric energy into the vibration motor 134 for a predetermined amount of time. The timing circuit 133 allows the foot 104 to soak in the cleaning solution 141 before initiating the operation of the vibration motor 134.

The vibration motor 134 is an electric motor. The vibration motor 134 converts electric energy into a vibrational energy. The vibration motor 134 forms a mechanical linkage with the vibrating disk structure 121. The vibration motor 134 transmits the generated vibrational energy to the vibrating disk structure 121 through the mechanical linkage.

The external power source 135 is an externally provided source of electric energy.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chamber: As used in this disclosure, a chamber is an enclosed or enclosable negative space that is dedicated to a purpose.

Clean: As used in this disclosure, the term clean refers to an object without dirt, unwanted markings, or undesirable pathogens. When referring to a surface, the term clean can also refer to removing unwanted objects from the surface. The term cleaning refers to the action of making an object clean.

Cleaning Agent: As used in this disclosure, a cleaning agent is a chemical compound used to remove pathogens, dirt and detritus from a surface.

Cleaning Brush: As used in this disclosure, a cleaning brush is a brush that is used to generate a friction that removes pathogens, dirt, and detritus from a surface. The cleaning brush is often used in combination with a cleaning solution.

Cleaning Pad: As used in this disclosure, a cleaning pad is a cleaning tool that comprises a structure formed by an abrasive material. The cleaning pad is used to scrub a surface.

Cleaning Solution: As used in this disclosure, a cleaning solution is a chemical solution that contains a solvent used to dissolve a cleaning agent.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Force of Gravity: As used in this disclosure, the force of gravity refers to a vector that indicates the direction of the pull of gravity on an object at or near the surface of the earth.

Force Sensor: As used in this disclosure, the force sensor is a sensor that generates an electrically measurable signal that is a function of the amount of force applied to the force sensor. The force sensor is often referred to as a pressure sensor. The force sensor commonly measures force using the piezoelectric effect generated by the deformation of a material. A pressure sensor is a force sensor calibrated to measure force per unit area.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Circuit: As used in this disclosure, a logic circuit is electrical device that receives one or more digital or analog inputs and uses those digital or analog inputs to generate one or more digital or analog outputs. This disclosure allows, but does not assume, that the logic circuit is a programmable device.

Maintained Switch: As used in this disclosure, a maintained switch is a switch that maintains the position that was set in the most recent switch actuation. A maintained switch works in an opposite manner to a momentary switch.

Massage: As used in this disclosure, a massage is a therapeutic process wherein the muscles of the body are kneaded for the purpose of aiding circulation and relaxing the muscles.

Motor: As used in this disclosure, a motor refers to the method of transferring energy from an external power source into mechanical energy.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Patient: As used in this disclosure, a patient is a person who is designated to receive a medical treatment, therapy, or service. The term patient may be extended to an animal when used within the context of the animal receiving veterinary treatment or services.

Perimeter: As used in this disclosure, a perimeter is one or more curved or straight lines that bounds an enclosed area on a plane or surface. The perimeter of a circle is commonly referred to as a circumference.

Pressure Switch: As used in this disclosure, a pressure switch is an electrical switch that is actuated by an applied pressure. Pressure switches are commercially available.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Rigid Structure: As used in this disclosure, a rigid structure is a solid structure formed from an inelastic material that resists changes in shape. A rigid structure will permanently deform as it fails under a force. See bimodal flexible structure.

Roughly: As used in this disclosure, roughly refers to a comparison between two objects. Roughly means that the difference between one or more parameters of the two compared objects are not significantly different.

Scrub: As used in this disclosure, the verb to scrub means to clean the surface of the object through the use of friction.

Segregated Space: As used in this disclosure, a segregated space refers to a first negative space that does not overlap with a second negative space. By overlap is meant that that the first negative space and a second negative space do not share any common spaces. As a practical matter, when two negative spaces are formed such that a fluid will not flow between the two negative spaces, the two negative spaces can be considered segregated.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape. Superior: As used in this disclosure, the term superior refers to a directional reference that is parallel to and in the opposite direction of the force of gravity when an object is positioned or used normally.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Therapeutic: As used in this disclosure, therapeutic is an adjective that refers to a medical, ameliorative, or hygienic substance, process, procedure, or device.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The "555" timing circuit is a well-known, documented, and commercially available timing circuit.

Timing Device: As used in this disclosure, a timing device is an automatic mechanism for activating or deactivating a device at a specific time or after a specific period of time. This disclosure assumes that the logic module is provisioned with a timing circuit that can be used as a timing device. A timing device that activates an audible alarm is often referred to as a timer.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Vibration Motor: As used in this disclosure, a vibration motor is an electric motor that rotates an unbalanced weight in such a manner that the electric motor vibrates during operation. The vibration can be varied by varying the rotational speed of the vibration motor. The rotational speed is varied by varying the electric current flowing through the vibration motor.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A foot scrubbing device comprising a pan structure, a vibration plate, and a control circuit;

wherein the vibration plate and the control circuit mount in the pan structure;

wherein the vibration plate comprises a vibrating disk structure and an abrasive surface;

wherein the vibrating disk structure is a rigid structure;

wherein the vibrating disk structure mounts on an interior surface of a closed face of the pan structure;

wherein the vibrating disk structure forms a pedestal structure of the vibration plate;

wherein the abrasive surface is formed on a superior face of the vibrating disk structure;

wherein the vibration of the abrasive surface generates a friction;

wherein a pressure switch is a momentary electric switch;

wherein the pressure switch is positioned underneath the vibrating disk structure of the vibration plate;

wherein the vibrating disk structure actuates the pressure switch between the closed position and the open position;

wherein the pressure switch is provided in the control circuit.

2. The foot scrubbing device according to claim 1 wherein the foot scrubbing device is a therapeutic device;

wherein the foot scrubbing device is a cleaning device;

wherein the foot scrubbing device is a massage device.

3. The foot scrubbing device according to claim 2 wherein the pan structure contains a cleaning solution;

wherein the control circuit is an electric circuit that converts electric energy into a vibration;

wherein the control circuit forms a mechanical linkage with the vibration plate;

wherein the control circuit transfers the generated vibration to the vibration plate.

4. The foot scrubbing device according to claim 3 wherein the pan structure is a roughly prism shaped structure;

wherein the pan structure has a pan shape;

wherein the pan structure is a hollow structure;

wherein the pan structure is formed from a fluid impermeable material;

wherein the pan structure forms a container.

5. The foot scrubbing device according to claim 4 wherein the pan structure comprises an open face, the closed face, and a lateral face structure;
wherein the open face is the open face of the pan shape of the pan structure;
wherein the closed face is the closed face of the pan shape of the pan structure;
wherein the closed face is the face of the pan structure that is distal from the open face;
wherein the closed face forms the horizontally oriented boundary surface of the containment space formed by the pan structure;
wherein the vibration plate mounts on the interior surface of the closed face;
wherein the lateral face structure is the lateral face of the pan shape of the pan structure;
wherein the lateral face structure forms the vertically oriented boundary surfaces of the containment space formed by the pan structure.

6. The foot scrubbing device according to claim 5 wherein the pan structure further comprises a circuit chamber;
wherein the circuit chamber is a fluid impermeable chamber that is formed in the pan structure;
wherein the circuit chamber forms a negative space located under the closed face of the pan structure;
wherein the circuit chamber forms a protected space that contains the control circuit;
wherein the vibration plate forms the mechanical linkage with the control circuit through a superior boundary of the circuit chamber.

7. The foot scrubbing device according to claim 6 wherein the control circuit transmits the vibration to the vibrating disk structure of the vibration plate;
wherein the control circuit initiates the vibration of the vibrating disk structure;
wherein the control circuit discontinues the vibration of the vibrating disk structure.

8. The foot scrubbing device according to claim 7 wherein the control circuit comprises a power switch, the pressure switch, a timing circuit, a vibration motor, and an external power source;
wherein the power switch, the pressure switch, the timing circuit, the vibration motor, and the external power source are electrically interconnected.

9. The foot scrubbing device according to claim 8 wherein the power switch is a maintained electric switch;
wherein the power switch forms an electric connection between the external power source and the pressure switch;
wherein the power switch actuates to the closed position to enable the flow of electric energy from the external power source to the pressure switch;
wherein the power switch actuates to the open position to disable the flow of electric energy from the external power source to the pressure switch.

10. The foot scrubbing device according to claim 9 wherein the timing circuit is an electric circuit;
wherein the timing circuit forms a timing device;
wherein the timing circuit initiates operation when the pressure switch actuates into the closed position;
wherein the timing circuit controls the flow of electric energy into the vibration motor;
wherein the timing circuit delays the flow of electric energy into the vibration motor for a predetermined amount of time.

11. The foot scrubbing device according to claim 10 wherein the vibration motor is an electric motor;
wherein the vibration motor converts electric energy into a vibrational energy;
wherein the vibration motor forms a mechanical linkage with the vibrating disk structure;
wherein the vibration motor transmits the generated vibrational energy to the vibrating disk structure through the mechanical linkage.

* * * * *